(12) United States Patent
Schloffer et al.

(10) Patent No.: US 10,526,902 B2
(45) Date of Patent: Jan. 7, 2020

(54) METHOD FOR PRODUCING A BLADE FOR A TURBOMACHINE

(71) Applicant: MTU Aero Engines AG, Munich (DE)

(72) Inventors: Martin Schloffer, Munich (DE); Wilfried Smarsly, Munich (DE)

(73) Assignee: MTU AERO ENGINES AG, Munich (DE)

( * ) Notice: Subject to any disclaimer, the term of this patent is extended or adjusted under 35 U.S.C. 154(b) by 325 days.

(21) Appl. No.: 15/497,602

(22) Filed: Apr. 26, 2017

(65) Prior Publication Data

US 2017/0314401 A1 Nov. 2, 2017

(30) Foreign Application Priority Data

Apr. 27, 2016 (EP) .................................. 16167367

(51) Int. Cl.
*B23K 20/12* (2006.01)
*F01D 5/28* (2006.01)
(Continued)

(52) U.S. Cl.
CPC ............ *F01D 5/28* (2013.01); *B23K 15/0046* (2013.01); *B23K 20/12* (2013.01); *B23K 26/21* (2015.10); *B23K 26/342* (2015.10); *F01D 5/147* (2013.01); *B23K 2101/001* (2018.08); *B23K 2103/14* (2018.08); *F05D 2220/323* (2013.01); *F05D 2230/22* (2013.01); *F05D 2230/239* (2013.01); *F05D 2230/30* (2013.01);
(Continued)

(58) Field of Classification Search
CPC ......... F01D 5/28; F01D 5/147; B23K 20/129; B23K 20/1205; B23K 26/342; B23K 15/0046; B23K 26/21; B23K 2103/18; B23K 20/10; B23K 20/12-1295; B23K 2103/14; B23K 2101/001; B23P 15/04; Y02T 50/673; F05D 2220/323; F05D 2230/232; F05D 2230/22; F05D 2230/239; F05D 2230/30; F05D 2230/42; F05D 2300/174; F05D 2230/50
USPC ............................ 228/2.1–2.3, 112.1–114.5; 29/889–889.722

See application file for complete search history.

(56) References Cited

U.S. PATENT DOCUMENTS 2,231,888 A * 2/1941 Couch ................... B21D 53/78
219/137 R
3,549,273 A 12/1970 Bird et al.
(Continued)

FOREIGN PATENT DOCUMENTS

DE     4409769 A1      9/1995
DE   102008052247 A1   4/2010
(Continued)

*Primary Examiner* — Kiley S Stoner
(74) *Attorney, Agent, or Firm* — Abel Schillinger, LLP

(57) ABSTRACT

Disclosed is a method for producing a blade for a turbomachine, in particular for an aero engine. The method comprises providing at least one blade airfoil with a first platform region and at least one blade root with a second platform region and joining the blade airfoil and the blade root at the respective platform regions by a friction welding method at a common joint region of the platform regions, the blade airfoil and the blade root being made of materials which are different from each other. Also disclosed is a blade which is and/or can be obtained by such a method.

20 Claims, 1 Drawing Sheet

(51) Int. Cl.
*B23K 26/21* (2014.01)
*B23K 26/342* (2014.01)
*B23K 15/00* (2006.01)
*F01D 5/14* (2006.01)
*B23K 101/00* (2006.01)
*B23K 103/14* (2006.01)

(52) U.S. Cl.
CPC ...... *F05D 2230/42* (2013.01); *F05D 2230/50* (2013.01); *F05D 2300/174* (2013.01)

(56) References Cited

U.S. PATENT DOCUMENTS

| | | | | |
|---|---|---|---|---|
| 3,768,147 | A * | 10/1973 | Berry | B23P 15/04 228/112.1 |
| 3,982,854 | A | 9/1976 | Berry et al. | |
| 4,873,751 | A * | 10/1989 | Walker | B23P 6/005 29/889.1 |
| 5,031,288 | A * | 7/1991 | Sadler | B23K 20/1205 29/889.21 |
| 5,366,344 | A * | 11/1994 | Gillbanks | B23K 20/1205 228/112.1 |
| 5,383,593 | A * | 1/1995 | Lechervy | B23K 15/0013 228/182 |
| 5,797,182 | A * | 8/1998 | Furlan | B23K 1/0016 29/889.21 |
| 5,813,593 | A * | 9/1998 | Galaske, Jr. | B23K 20/1205 228/112.1 |
| 5,865,364 | A * | 2/1999 | Trask | B23K 20/1205 228/212 |
| 6,095,402 | A * | 8/2000 | Brownell | B23K 20/1205 228/112.1 |
| 6,106,233 | A * | 8/2000 | Walker | B23K 20/1205 416/213 R |
| 6,478,545 | B2 * | 11/2002 | Crall | B23K 20/129 416/213 R |
| 6,616,408 | B1 * | 9/2003 | Meier | B23K 13/01 416/193 A |
| 6,666,653 | B1 * | 12/2003 | Carrier | F01D 5/3061 29/889.21 |
| 7,419,082 | B2 * | 9/2008 | Brownell | B23K 20/1205 228/2.1 |
| 8,267,663 | B2 | 9/2012 | Larose et al. | |
| 8,876,992 | B2 | 11/2014 | Das | |
| 8,882,442 | B2 | 11/2014 | Smarsly et al. | |
| 9,121,296 | B2 | 9/2015 | McCaffrey | |
| 2002/0070492 | A1 * | 6/2002 | Collot | B23K 20/1205 269/55 |
| 2002/0090302 | A1 * | 7/2002 | Norris | F01D 5/147 416/224 |
| 2002/0127108 | A1 * | 9/2002 | Crall | B23K 20/129 416/213 R |
| 2004/0005219 | A1 * | 1/2004 | Phipps | F01D 5/02 416/219 R |
| 2004/0018091 | A1 * | 1/2004 | Rongong | F01D 5/147 416/229 A |
| 2005/0098608 | A1 * | 5/2005 | Adde | B23K 20/1205 228/112.1 |
| 2006/0051211 | A1 * | 3/2006 | Ferte | B23K 20/129 416/213 R |
| 2008/0244905 | A1 * | 10/2008 | Meier | B23K 26/24 29/889.1 |
| 2009/0314823 | A1 * | 12/2009 | Bray | B23K 20/1205 228/112.1 |
| 2011/0138624 | A1 * | 6/2011 | Chin | B23K 20/1205 29/889.1 |
| 2011/0138625 | A1 * | 6/2011 | Chin | B23K 20/1205 29/889.1 |
| 2011/0305578 | A1 | 12/2011 | Smarsly et al. | |
| 2012/0048430 | A1 | 3/2012 | Das | |
| 2012/0148413 | A1 * | 6/2012 | Richter | B23P 6/005 416/223 R |
| 2012/0224972 | A1 * | 9/2012 | Stiehler | B23K 13/00 416/223 A |
| 2013/0115089 | A1 | 5/2013 | McCaffrey | |
| 2014/0120483 | A1 * | 5/2014 | Trapp | F01D 5/005 432/9 |
| 2014/0356159 | A1 * | 12/2014 | Heikurinen | F04D 29/023 415/210.1 |
| 2015/0300182 | A1 * | 10/2015 | Mottin | B23P 6/005 416/213 R |
| 2015/0369046 | A1 * | 12/2015 | Roberge | F02C 3/04 60/805 |
| 2016/0146024 | A1 * | 5/2016 | Morris | F01D 5/3061 416/96 R |
| 2016/0237834 | A1 * | 8/2016 | Franklin | F01D 5/34 |
| 2016/0273368 | A1 * | 9/2016 | Smarsly | B22F 3/04 |
| 2017/0022827 | A1 * | 1/2017 | Waldman | F01D 5/3061 |
| 2017/0145837 | A1 * | 5/2017 | Schloffer | B23K 20/1205 |
| 2017/0328225 | A1 * | 11/2017 | Mottin | B23K 20/1205 |

FOREIGN PATENT DOCUMENTS

| | | | |
|---|---|---|---|
| DE | 102013226221 A1 | 6/2015 | |
| EP | 0924016 A1 * | 6/1999 | ........ B23K 20/1205 |
| EP | 2423340 A1 | 2/2012 | |
| EP | 2444192 A2 * | 4/2012 | ........ B23K 20/1205 |
| EP | 2487005 A2 * | 8/2012 | ............. B22F 3/105 |
| EP | 2589755 A2 | 5/2013 | |
| WO | WO-2015110746 A1 * | 7/2015 | ........... B23K 20/129 |

\* cited by examiner

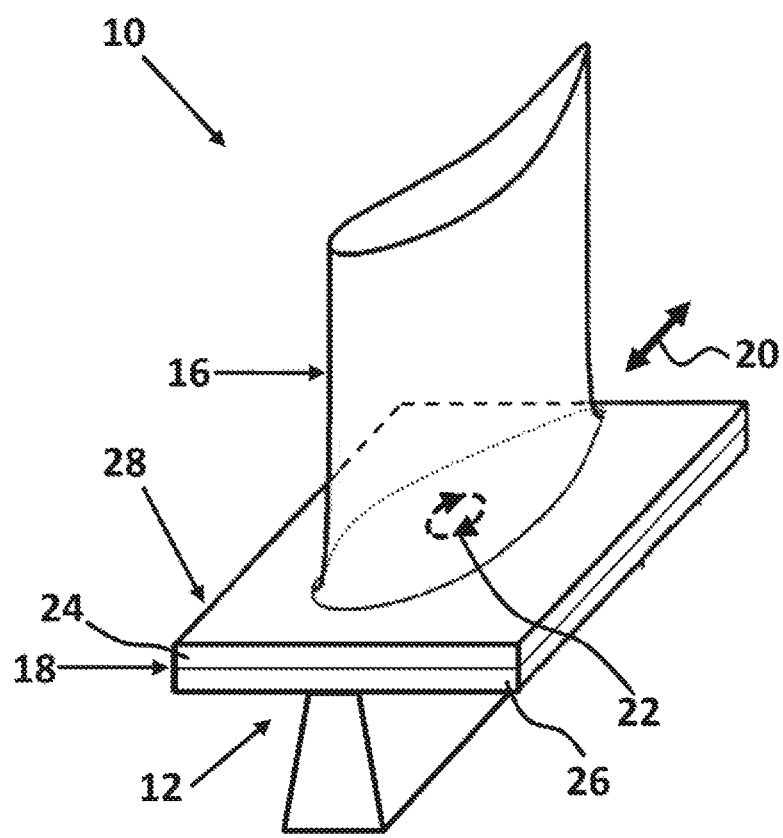

METHOD FOR PRODUCING A BLADE FOR A TURBOMACHINE

CROSS-REFERENCE TO RELATED APPLICATIONS

The present application claims priority under 35 U.S.C. § 119 of European Patent Application No. 16167367.8, filed Apr. 27, 2016, the entire disclosure of which is expressly incorporated by reference herein.

BACKGROUND OF THE INVENTION

1. Field of the Invention

The invention relates to a method for producing a blade for a turbomachine, in particular for an aero engine. The invention also relates to a blade for a turbomachine.

2. Discussion of Background Information

When producing blades of turbomachines, great care is needed in order to ensure high reliability with respect to breakdown. When configuring and manufacturing the blades, a substantial challenge is that, on one hand, these have to withstand extreme mechanical and thermal loads and, on the other hand, the highest possible efficiency during operation of the turbomachine is to be achieved. Often, the blades are produced individually and joined to a rotor ring. Joining the blades to the circumference of the rotor ring creates a bladed rotor which can be used in turbomachines. However, although this conventional production method is simple, too little attention is paid for example to the situation where locally different load types and stress distributions arise within the bladed rotor. Thus, for example, different values of mechanical loading arise along the blades as a consequence of high-frequency mechanical and aerodynamic excitations and centrifugal forces, to name but a few. If the blades are inadequately designed, this can lead to structural damage and, in the worst case, to blade loss. Under the extreme loads and rotational speeds of the rotor ring, this kind of damage often destroys the turbomachine.

In view of the foregoing, it would be advantageous to have available a method for producing a blade for a turbomachine, which method permits particularly exact adjustment of strength requirements of the blade determined with respect to possible loading. It would also be advantageous to have available a blade for a turbomachine which has strength values that are determined with particular exactness with respect to possible loading.

SUMMARY OF THE INVENTION

The present invention provides a method for producing a blade for a turbomachine, in particular for an aero engine. The method comprises providing at least one blade airfoil with a first platform region and at least one blade root with a second platform region and joining the blade airfoil and the blade root at the respective platform regions by a friction welding method at a common joint region of the platform regions. The blade airfoil and the blade root are made of materials which are different from each other.

In one aspect of the method, the friction welding method may comprise a linear friction welding method and/or an orbital friction welding method.

In another aspect, the blade airfoil may be made of a first TiAl alloy, for example, a first TiAl alloy which comprises, as further alloying constituent in addition to Ti and Al, at least one element from the group W, Mo, Nb, Co, Hf, Y, Zr, Er, Gd, Si, and C.

In yet another aspect, the blade root may be made of a second TiAl alloy which is different from the first TiAl alloy.

In a still further aspect of the method, the blade root may be produced by providing a body made of the second TiAl alloy, which is then forged, homogenization-annealed and subsequently shaped into the blade root, the blade root being smoothed at least in some regions.

In another aspect, at least the blade airfoil may be built up by a thermo-mechanical production method or an additive production method such as, e.g., selective laser melting, selective laser sintering, electron beam melting and laser deposition welding and/or by hot-isostatic pressing of a capsule filled with material powder.

In another aspect of the method, the blade root and/or the blade airfoil may be heat-treated prior to joining, and/or after the blade airfoil has been joined to the blade root the joint region may be subjected to a localized heat treatment and/or the entire blade may be subjected to a precipitation heat treatment.

The present invention also provides a blade for a turbomachine, in particular for an aero engine. The blade comprises a blade airfoil made of a first material and a blade root made of a second material that is different from the first material. The blade airfoil is joined directly to the blade root by a friction welding method to form a common joint region.

In one aspect of the blade, the blade airfoil may be made of a first TiAl alloy, for example, a TiAl alloy that comprises, as further alloying constituent in addition to Ti and Al, one or more elements from the group W, Mo, Nb, Co, Hf, Y, Zr, Er, Gd, Si, and C.

In another aspect, the blade root may be made of a second TiAl alloy which is different from the first TiAl alloy.

The present invention also provides a turbomachine, in particular an aero engine, which comprises at least one blade that is obtained by the method set forth above or is a blade as set forth above.

A first aspect of the invention relates to a method for producing a blade for a turbomachine, in particular for an aero engine, comprising at least the following:

providing at least one blade airfoil with a first platform region;

providing at least one blade root with a second platform region; and joining the blade airfoil and the blade root at the respective platform regions by a friction welding method at a common joint region of the platform regions, wherein the blade airfoil and the blade root are made of respectively different materials.

The two platform regions can be joined to form one platform, and so the blade root can be joined to the blade airfoil. In that context, the platform can be what is referred to as an inner shroud. This method makes it possible to make the blade airfoil and the blade root separately and of different materials, and to subsequently join them by means of the friction welding method. This has the advantage of permitting particularly exact adjustment of strength requirements of the blade determined with respect to possible loading. In addition, the blade root and the blade airfoil can for example undergo different heat-treatment processes prior to joining, before the two joined parts (in this case the blade airfoil and the blade root) are ultimately joined by the friction welding method to create the blade. This also makes it possible for the strength of the blade to be set in a targeted manner and differently for different blade regions. For example, different TiAl alloys with different properties can respectively be used for the blade airfoil and the blade root. For example, it is thus possible to produce the blade airfoil using a TiAl alloy that is more creep-resistant and more brittle than the TiAl alloy to be provided for the blade root. For example, if the blade airfoil is made of the especially creep-resistant and brittle TiAl alloy, it is possible to achieve a design of the blade airfoil that is particularly appropriate for the loads occurring, which would not be possible with conventional, one-piece production of the blade from a single material, owing to a necessary minimum ductility of the blade. The blade root can for example be made of a TNM-TiAl alloy, where TNM-TiAl can also be termed titanium aluminide (or γ-titanium). The "titanium aluminide" group of materials is characterized by particularly high heat resistance and low density. This material is therefore particularly well-suited for being made into components designed for use under high temperatures and high centrifugal forces. In the friction welding method, the parts to be joined are pressed together at the common joint region, which is heated by friction as a result of relative movement between the parts to be joined. This causes localized melting of the blade airfoil and of the blade root, at least in the joint region, and ultimately joining of the parts to be joined. The joint region can be in the region of a lower root strip of the blade root, and thus at a location which is not critical with respect to loading of the blade. Another advantage of joining using the friction welding method is that friction welding creates narrow, defined transition zones between the blade airfoil and the blade root, and thus in the joint region. The joint region and the transition zones are preferably positioned, by appropriate geometric selection, where the finished blade will have the lowest loads and/or the largest cross-sectional area. Thus, the low ductility of any intermetallic phases arising in the joint region is not critical. Once the blade airfoil has been joined to the blade root, the latter can be secured, for example forming a slotted connection, to a rotor main body, which can for example be configured as a disk. This makes it possible to establish a particularly simple and secure connection between the blade and the rotor main body.

In one advantageous embodiment of the invention, the friction welding method is a linear friction welding method and/or an orbital friction welding method. This is advantageous since, both in the case of the linear friction welding method and in the case of the orbital friction welding method and contrary to rotation welding, the parts to be joined (in this case the blade root and the blade airfoil) need not be symmetrical. In linear friction welding, friction heat is generated by linear relative movement between the parts to be joined. The linear friction welding method presents a particularly simple friction welding method since it involves only a linear movement between the parts to be joined. By contrast, in orbital friction welding the joint region is heated by a relative movement of the parts to be joined in a closed movement path. In the orbital friction welding method, the movement path can for example be circular or elliptical, to name just some possible shapes of circular paths. The linear friction welding method can also be carried out in addition to—and so to speak in combination with—the orbital friction welding method. Such a combination of these two welding methods is obtained for example when the movement path has both rounded and linear path regions. Another example of this combination is when the welding procedure involves, for example, the blade root being moved in linear fashion and the blade airfoil being moved on a circular path, or vice versa. An advantage of the combination of the linear friction welding method and the orbital friction welding method is that it is possible to achieve particularly even heating of the parts that are to be joined. That makes it possible to reduce any stresses in the joint region and in a boundary region around the former. The friction welding method can also be a multi-orbital friction welding method. In the multi-orbital friction welding method, both of the parts that are to be joined can be moved relative to one another on respective circular paths. This makes it possible to provide particularly even heating of the parts that are to be joined.

In another advantageous embodiment of the invention, a blade airfoil is made of a first TiAl alloy, in particular a first TiAl alloy which comprises, as further alloying constituent in addition to Ti and Al, at least one element from the group W, Mo, Nb, Co, Hf, Y, Zr, Er, Gd, Si and C. In other words, for building up or producing at least the blade airfoil, use is made of a TiAl alloy, in particular a TiAl alloy which comprises, as further alloying constituent in addition to Ti and Al, at least one element from the group W, Mo, Nb, Co, Hf, Y, Zr, Er, Gd, Si and C. This makes it possible to use high-temperature alloys for the blade airfoil without at the same time having to satisfy any ductility requirements for the blade root.

In another advantageous embodiment of the invention, a blade root is made of a second TiAl alloy which is different from the first TiAl alloy. TiAl alloys of this kind, which can also be termed titanium aluminide alloys, have particularly good strength properties and at the same time particularly low density. The two TiAl alloys can for example differ in terms of their respective other alloying constituents (W, Mo, Nb, Co, Elf, Y, Zr, Er, Gd, Si and C) and additionally or alternatively in terms of the concentration of the respective other alloying constituents. The material properties of the respective TiAl alloys can be particularly expediently modified by varying these alloying constituents.

In another advantageous embodiment of the invention, the blade root is produced by providing a body made of the second TiAl alloy, which is then forged, homogenization-annealed and subsequently shaped into the blade root, wherein the blade root is smoothed at least in certain regions. The blade root can for example be made from said body, which is for example formed as a plate of the second TiAl alloy. This plate can, after forging and homogenization annealing, for example be divided into prismatic semi-finished products for producing a plurality of blade roots. The semi-finished products can then be shaped to give the blade roots and then mechanically or electrolytically machined, in certain regions and for example on a part-surface of the blade root, in order to provide a metallically blank joining surface. The part-surface can be that surface at which the blade root is subsequently to be joined to the blade airfoil at the joint region. This represents a particularly cost-effective production method, in which multiple blade roots can be provided simply.

In another advantageous embodiment of the invention, at least the blade airfoil is built up by means of a thermo-mechanical production method or by means of an additive production method, in particular by selective laser melting (SLM), selective laser sintering, electron beam melting (EBM) and/or laser deposition welding (LMD), and/or by hot-isostatic pressing of a capsule filled with material powder. A forging method is one example of such a thermo-mechanical production method. The blade airfoil can also for example be built up using EBM and/or SLM in a vacuum, in a powder bed (of TiAl powder). Alternatively or additionally, the blade airfoil can be built up by providing a TiAl capsule which is filled with powder, evacuated, baked out, welded and hot-isostatically pressed (HIPed). Production methods of this kind make it possible to set the properties of the blade airfoil in a particularly targeted manner. En summary, it is thus possible to produce the blade airfoil using a powder-metallurgic production method, using a melt-metallurgic production method or using a thermo-mechanical production method. The material powder can for example be a metallic powder and additionally or alternatively a ceramic powder. A metallic powder can also have a mixture of two or more different metals, wherein at least one of the production methods can be used to form, from the powder, what is referred to as an intermetallic compound.

In another advantageous embodiment of the invention, the blade root and/or the blade airfoil is/are heat-treated prior to joining. In the context of the present invention, heat treatment is to be understood as a method in which the workpiece in question is heated at least once to above ambient temperature and is cooled at least once back down to ambient temperature. It is thus possible for the blade root and the blade airfoil to each undergo different heat treatments independently of one another. The possibility of carrying out different heat treatments for the blade root and the blade airfoil makes it possible to create different microstructures in the two parts, by virtue of which it is for example possible to satisfy the necessary strength and ductility requirements. It is thus for example possible to give the blade root greater ductility and strength—and therefore lower creep resistance—than the blade airfoil, while the blade airfoil has, in comparison to the blade root, particularly high creep resistance and constant strength up to 900° C. at the expense of low-temperature strength and reduced ductility.

In another advantageous embodiment of the invention, after the blade airfoil has been joined to the blade root, the joint region undergoes localized heat treatment. In that context, the joint region can for example undergo localized inductive heat treatment after friction welding, in order to create a desired microstructure in the joint region. This is advantageous because it is thus also possible to adjust the material properties in and around the joint region.

In another advantageous embodiment of the invention, after the blade airfoil has been joined to the blade root, the entire blade undergoes precipitation heat treatment. This is advantageous because the precipitation heat treatment makes it possible to dissipate any stresses within the blade. The precipitation heat treatment can be carried out before the joined blade is machined to its final dimensions.

A second aspect of the invention relates to a blade for a turbomachine, in particular for an aero engine, comprising a blade airfoil and a blade root, wherein the blade airfoil is joined directly to the blade root by means of a friction welding method, forming a common joint region, wherein the blade airfoil and the blade root are made of respectively different materials. The resulting features and their advantages can be found in the description of the first aspect of the invention. In that context, the blade airfoil can for example be made of a first TiAl alloy, in particular a first TiAl alloy which comprises, as further alloying constituent in addition to Ti and Al, at least one element from the group W, Mo, Nb, Co, Hf, Y, Zr, Er, Gd, Si and C. The blade root can for example be made of a second TiAl alloy which is different from the first TiAl alloy. Overall, the blade according to the invention can be obtained with a method according to the first aspect of the invention. A blade so formed or produced can have different strength properties in different blade regions, so for example in the blade root and in the blade airfoil, which properties can be set with particular exactness with regard to expected loads.

A third aspect of the invention relates to a turbomachine, in particular an aero engine, comprising at least one blade which is and/or can be obtained by a method according to the first aspect of the invention, and/or is designed according to at least one embodiment of a blade according to the second aspect of the invention. The resulting features and their advantages can be found in the descriptions of the first and second aspects of the invention.

Further features of the invention emerge from the claims and the exemplary embodiments. The features and combinations of features specified above in the description, and the features and combinations of features mentioned in the exemplary embodiments and/or described in isolation hereinbelow, can be used not only in the combination indicated in each case, but also in other combinations or in isolation, without departing from the scope of the invention. Thus, embodiments of the invention which are not explicitly indicated and described in the exemplary embodiments, but which proceed from and may consist of separate combinations of features from the described embodiments, are also to be regarded as having been included and disclosed. In addition, therefore, embodiments and combinations of features which do not have all the features of an originally formulated independent claim are also to be regarded as having been disclosed.

BRIEF DESCRIPTION OF THE DRAWING

In this context, the single FIGURE is a schematic perspective view of a blade, produced by a method according to the invention, for a turbomachine.

DETAILED DESCRIPTION OF EMBODIMENT OF THE INVENTION

The FIGURE shows a blade 10 for a turbomachine (not shown further here), which can for example be configured as an aero engine. The blade 10 can for example be designed as a rotor blade for a blade ring. Alternatively, the blade 10 can also be designed as a stator vane.

In the present exemplary embodiment, a blade airfoil 16 with a first platform region 24 is made of a first TiAl alloy which for example comprises tungsten (W) as further alloying constituent in addition to titanium (Ti) and aluminum (Al). In order to make the blade airfoil 16, use can be made, for example, of an additive production method, for example selective laser melting, selective laser sintering, electron beam melting and/or laser deposition welding, and/or hot-isostatic pressing of a capsule filled with material powder. Also provided is a blade root 12 with a second platform region. In the present exemplary embodiment, the blade root 12 is produced by forging and subsequent homogenization annealing at a temperature of 1150° C. for eight hours.

In the present case, the blade root 12 is made of a second TiAl alloy that is different from the first TiAl alloy. Thus, the blade airfoil 16 and the blade root 12 respectively consist of different materials. In the present case, the blade root 12 is produced by first providing a body of the second TiAl alloy which was forged, homogenization-annealed and then shaped into the blade root 12. Subsequently, the blade root 12 is smoothed at least in certain regions, in the present case on the second platform region 26. The smoothing at least in certain regions can for example be electrolytic polishing or a chip-removing smoothing method such as milling or grinding. In addition to the blade root 12, the blade airfoil 16 can also undergo such a smoothing in certain regions. In the present case, the first platform region 24 of the blade airfoil 16 has also been smoothed. If both the blade root 12 and the blade airfoil 16 undergo smoothing, prior to joining, at respective joining regions (of the blade root 12 and of the blade airfoil 16) that at least partially form a later joint region 18, it is possible to obtain a particularly durable join.

The present case shows how the blade airfoil 16 is joined directly, by a friction welding method, to the blade root 12 at the common joint region 18. In the present exemplary embodiment, the joint region 18 is that region at which the two platform regions 24, 26 are joined by the friction welding method to give a platform 28. In the present case, the platform 28 is an inner shroud of the blade 10.

Both the blade root 12 and the blade airfoil 16 were heat-treated prior to joining, this not being shown in greater detail here. In the present exemplary embodiment, the friction welding method is a combination of a linear friction welding method and an orbital friction welding method.

The combination consists in the fact that, during the friction welding method, the blade root 12 is subject to a linear movement 20 (it is moved back-and-forth in linear fashion), while the blade airfoil 16 follows a closed path movement 22. These combinations, which, so to speak, represent superpositions of the movements, establish a movement path (relative movement between the blade root 12 and the blade airfoil 16). After joining, the joint region 18 undergoes localized heat treatment (not shown here). Furthermore, after the blade airfoil 16 has been joined to the blade root 12, the entire blade 10 undergoes precipitation heat treatment (not shown here either) in order to reduce any stresses within the blade 10.

In summary, the invention makes it possible to join the brittle TiAl blade root 12 to a rotor disk by means of a mechanical connection means despite the fact that this connection has many problems in prior art systems (e.g. slot-type connection). In order to reduce this problem in the mechanical connection point, according to the invention described here the blade 10 on the blade root 12 is made of a more ductile alloy than the blade airfoil 16. In addition, the blade airfoil 16 is joined to the blade root 12 which is made of a different alloy, wherein both materials belong to the class of the TiAl alloys. In that context, a new, high-temperature-resistant and high-alloyed TiAl alloy is friction-welded to a known TiAl material that satisfies the necessary ductility requirements. The blade root 12 and the blade airfoil 16 can be produced and heat-treated independently of one another, depending on the most economical production route, or can even be end-heat-treated in order to finally be friction-welded together and then machined to their final contour.

What is claimed is:

1. A method for producing a blade for a turbomachine, wherein the method comprises providing at least one blade airfoil with a first platform region and at least one blade root with a second platform region and joining the blade airfoil and the blade root at respective platform regions by a friction welding method at a common joint region of the platform regions to form a joint platform, the blade airfoil and the blade root being made of materials which are different from each other.

2. The method of claim 1, wherein the friction welding method comprises a linear friction welding method.

3. The method of claim 1, wherein the friction welding method comprises an orbital friction welding method.

4. The method of claim 1, wherein the blade airfoil is made of a first TiAl alloy.

5. The method of claim 4, wherein the first TiAl alloy comprises, as further alloying constituent in addition to Ti and Al, one or more of W, Mo, Nb, Co, Hf, Y, Zr, Er, Gd, Si, C.

6. The method as claimed in claim 4, wherein the blade root is made of a second TiAl alloy which is different from the first TiAl alloy.

7. The method as claimed in claim 6, wherein the blade root is made of a titanium aluminide.

8. The method of claim 6, wherein the blade root is produced by providing a body made of the second TiAl alloy, which is then forged, homogenization-annealed and subsequently shaped into the blade root, the blade root being smoothed at least in some regions.

9. The method of claim 1, wherein at least the blade airfoil is built up by one or more of selective laser melting, selective laser sintering, electron beam melting and laser deposition welding and/or by hot-isostatic pressing of a capsule filled with material powder.

10. The method of claim 1, wherein at least one of the blade root and the blade airfoil is heat-treated prior to joining.

11. A blade for a turbomachine, wherein the blade comprises a blade airfoil having a first platform region and being made of a first material and a blade root having a second platform region and being made of a second material that is different from the first material, the first platform region of the blade airfoil being joined directly to the second platform region of the blade root by a friction welding method to form a common joint platform.

12. The blade of claim 11, wherein the blade airfoil is made of a first TiAl alloy.

13. The blade of claim 12, wherein the first TiAl alloy comprises, as further alloying constituent in addition to Ti and Al, one or more of W, Mo, Nb, Co, Hf, Y, Zr, Er, Gd, Si, C.

14. The blade of claim 12, wherein the blade root is made of a second TiAl alloy which is different from the first TiAl alloy.

15. The blade of claim 14, wherein the blade root is made of a titanium aluminide.

16. A turbomachine, in particular an aero engine, wherein the turbomachine comprises the blade of claim 11.

17. The blade of claim 13, wherein the first alloy comprises W.

18. The blade of claim 17, wherein the blade root is made of a titanium aluminide.

19. The method of claim 5, wherein the first TiAl alloy comprises W.

20. The method of claim 19, wherein the blade root is made of a titanium aluminide.

* * * * *